US012705538B2

(12) United States Patent
Coyne et al.

(10) Patent No.: US 12,705,538 B2
(45) Date of Patent: Aug. 11, 2026

(54) MACHINE LEARNING MODEL FOR PERSONALIZED USER INTERFACES

(71) Applicant: Wells Fargo Bank, N.A., San Francisco, CA (US)

(72) Inventors: Joseph V. Coyne, Charlotte, NC (US); Hilani Kerr, Darien, CT (US); Jennel Ann McDonald, Oakland, CA (US); Madhumati Narasimhan, Pleasanton, CA (US); Pablo S. Simone, New York, NY (US); Ashish Dilip Tengshe, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 657 days.

(21) Appl. No.: 18/300,935

(22) Filed: Apr. 14, 2023

(65) Prior Publication Data

US 2023/0334373 A1 Oct. 19, 2023

Related U.S. Application Data

(60) Provisional application No. 63/363,080, filed on Apr. 15, 2022.

(51) Int. Cl.
*G06N 20/00* (2019.01)

(52) U.S. Cl.
CPC .................................... *G06N 20/00* (2019.01)

(58) Field of Classification Search
CPC ...... G06N 20/00; G06Q 30/015; G06Q 40/02; G06Q 40/04; G06Q 40/06
See application file for complete search history.

(56) References Cited

U.S. PATENT DOCUMENTS

| | | | | |
|---|---|---|---|---|
| 8,341,057 B1 * | 12/2012 | Wagner | G06Q 40/02 705/36 R |
| 8,738,418 B2 * | 5/2014 | Winters | G06Q 30/0601 705/7.29 |
| 11,397,783 B1 * | 7/2022 | Caro | G06F 16/9535 |
| 11,412,298 B1 * | 8/2022 | Anzalone | A61B 5/167 |
| 2010/0100424 A1 * | 4/2010 | Buchanan | G06Q 20/4016 715/745 |
| 2010/0280976 A1 * | 11/2010 | Carpenter | G06Q 40/06 705/500 |

(Continued)

*Primary Examiner* — Hien L Duong

(74) *Attorney, Agent, or Firm* — SCHWEGMAN LUNDBERG & WOESSNER, P.A.

(57) ABSTRACT

A method may include presenting a user interface on a computing device including a first portion to receive a selection of a set of subjective attributes associated with financial goals of a user; and a second portion to receive a selection of a set of objective attributes the user including a demographic attribute of the user; inputting the set of objective attributes and subjective attributes into a machine learning model; in response receiving an output from the machine learning model; identifying a cluster identifier; querying a datastore using the cluster identifier to receive a set of quantitative financial attributes of a plurality of users associated with the cluster identifier; updating the user interface to present a comparison of the set of quantitative financial attributes of the plurality of users associated with the cluster identifier to the set of quantitative financial attributes for the user.

17 Claims, 13 Drawing Sheets

(56) References Cited

U.S. PATENT DOCUMENTS

| | | | | |
|---|---|---|---|---|
| 2011/0107265 | A1* | 5/2011 | Buchanan | G06Q 30/02<br>715/835 |
| 2015/0235006 | A1* | 8/2015 | Nichols | G06Q 10/10<br>434/238 |
| 2019/0213660 | A1* | 7/2019 | Astrada | G06Q 40/02 |
| 2020/0104763 | A1* | 4/2020 | Carney | G06Q 10/04 |
| 2022/0027983 | A1* | 1/2022 | Ben David | G06Q 40/03 |
| 2022/0237700 | A1* | 7/2022 | Sreenivasan | G06F 3/0488 |
| 2022/0292608 | A1* | 9/2022 | Souder | G06Q 40/06 |
| 2023/0062714 | A1* | 3/2023 | Rotimi-Fadipe | G06Q 10/107 |
| 2023/0075411 | A1* | 3/2023 | Jeph | G06Q 40/06 |

* cited by examiner

MACHINE LEARNING MODEL FOR PERSONALIZED USER INTERFACES

CLAIM OF PRIORITY

This patent application claims the benefit of U.S. Provisional Patent Application No. 63/363,080, titled "PERSONALIZED PATH USER INTERFACE." filed Apr. 15, 2022, which is herein incorporated by reference in its entirety.

BACKGROUND

Mobile apps and web-based application allow a user to view information related to various aspects of a service. For example, a music application may allow a user to see the user's favorite musicians, or a financial application may allow for viewing an overview of the user's finances.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
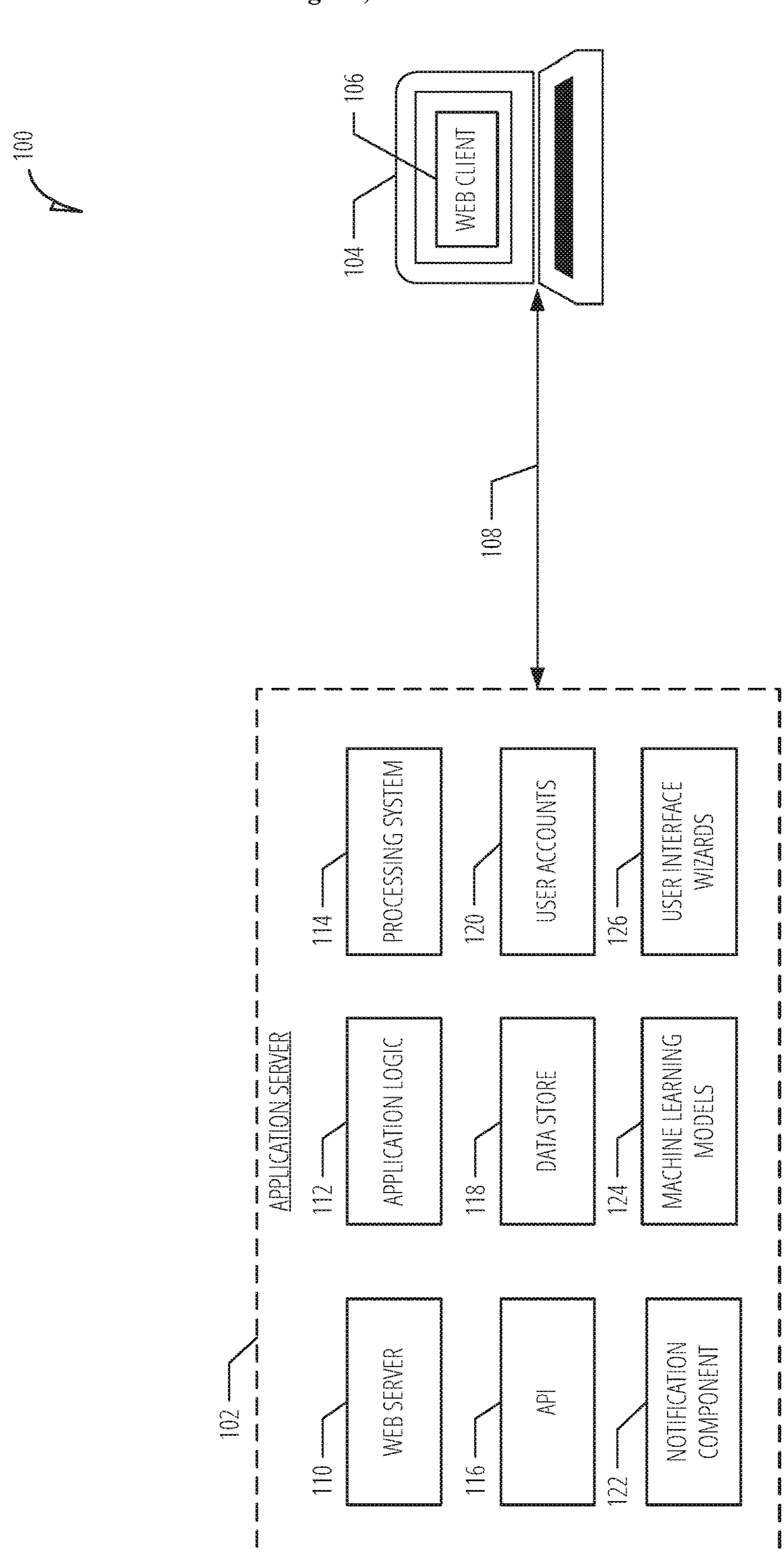
FIG. 1 is an illustration of components of a client device and an application server, according to various examples.

Most financial service customer facing applications are static and not personalized to the user. For example, an application may list the balances of the user and provide a way to see past transactions and potentially categorize those transactions automatically. This experience, however, is often the same for each individual, and does not take into consideration the financial acuity of a user or possible goals of the user with respect to their financial health. Additionally, there is often no indication that the financial services company has knowledge of what is going on in a user's life. Thus, even though a user's situation may change, there may be no one that reaches out if there is a change in activity based on that life event, or ways in which the financial institution may help.

Additionally, a backend service may try and group users together, but the result may be incorrect. For example, a machine learning model may use demographic information and financial information (e.g., balances, types of investments) to group users. A problem with these systems is that they lack user input. Thus, a person is more than their quantitative data and by failing to recognize that users have different goals, treating groups of similar without this input may lead to interfaces that are not relevant to the user, or at least incomplete.

Described herein are systems and methods that enable to a user to have a personalized experience with a financial services company (e.g., a bank). When a user decides to change to this type of personalized experience an initial questionnaire may be given to the user to help facilitate the personalization. Based in part on the results, the user may have the opportunity to select a team of advisors that meet the user's need rather than have an advisor automatically assigned. Because the system may now know more about your goals and interests, the personalized experience may allow the user to compare themselves to like users and see how they are doing and ways they try and improve their financial health.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include transmitting data (e.g., a hypertext markup language file) from a first device (such as a web server) to the computing device for rendering on a display device of the computing device via a rendering engine such as a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

FIG. 1 is an illustration 100 of components of a client device 104 and an application server 102, according to various examples. Application server 102 includes web server 110, application logic 112, processing system 114, application programming interface (API) 116, data store 118, user accounts 120, notification component 122, machine learning models 124, and user interface wizards 126.

Application server 102 is illustrated as set of separate elements (e.g., components, logic, etc.). However, the functionality of multiple, individual elements may be performed by a single element. An element may represent computer program code that is executable by processing system 114. The program code may be stored on a storage device (e.g., data store 118) and loaded into a memory of the processing system 114 for execution. Portions of the program code may be executed in a parallel across multiple processing units (e.g., a core of a general-purpose computer processor, a graphical processing unit, an application specific integrated circuit, etc.) of processing system 114. Execution of the code may be performed on a single device or distributed across multiple devices. In some examples, the program code may be executed on a cloud platform (e.g., MICROSOFT AZURE® and AMAZON EC2®) using shared computing infrastructure.

Client device 104 may be a computing device which may be, but is not limited to, a smartphone, tablet, laptop, multi-processor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 104 and Application server 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet. Client device 104 and application server 102 may communicate data 108 over the network. Data 108 may include user interfaces, responses to queries to the user, and push notifications, among other items as discussed further herein.

In some examples, the communication may occur using an application programming interface (API) such as API 116. An API provides a method for computing processes to exchange data. A web-based API (e.g., API 116) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 118).

Application server 102 may include web server 110 to enable data exchanges with client device 104 via web client 106. Although generally discussed in the context of delivering webpages via the Hypertext Transfer Protocol (HTTP), other network protocols may be utilized by web server 110 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page that is rendered on a display device of a client device (e.g., a mobile phone, desktop computer, etc.).

Additionally, web server 110 may enable a user to interact with one or more web applications provided in a transmitted web page. A web application may provide user interface (UI) components that are rendered on a display device of client device 104. The user may interact (e.g., select, move, enter text into) with the UI components, and, based on the interaction, the web application may update one or more portions of the web page. A web application may be executed in whole, or in part, locally on client device 104. The web application may populate the UI components with data from external sources or internal sources (e.g., data store 118) in various examples.

In various examples, the web application is a dynamic user interface that provides a personalized experience to the user. More details and example interfaces of the web application are presented in the following figures.

The web application may be executed according to application logic 112. Application logic 112 may use the various elements of application server 102 to implement the web application. For example, application logic 112 may issue API calls to retrieve or store data from data store 118 and transmit it for display on client device 104. Similarly, data entered by a user into a UI component may be transmitted using API 116 back to the Web Server. Application logic 112 may use other elements (e.g., user accounts 120, notification component 122, machine learning models 124, and user interface wizards 126) of application server 102 to perform functionality associated with the web application as described further herein.

Data store 118 may store data that is used by application server 102 or discussed with respect to the elements of application server 102. Data store 118 is depicted as singular element, but may in actuality be multiple data stores. The specific storage layout and model used in by data store 118 may take a number of forms—indeed, a data store 118 may utilize multiple models. Data store 118 may be, but is not limited to, a relational database (e.g., SQL), non-relational database (NoSQL) a flat file database, object model, document details model, graph database, shared ledger (e.g., blockchain), or a file system hierarchy. Data store 118 may store data on one or more storage devices (e.g., a hard disk, random access memory (RAM), etc.). The storage devices may be in standalone arrays, part of one or more servers, and may be located in one or more geographic areas.

User accounts 120 may include user profiles on users of application server 102. A user profile may include credential information such as a username and hash of a password. A user may enter in their username and plaintext password to a login page of application server 102 to view their user profile information or interfaces presented by application server 102 in various examples.

A user profile may also include authorization to access other services in which the user has an account. The authorizations may include a token (e.g., using OAuth) or login credentials that authorize application server 102 to retrieve data from the other services in a defined format such as JavaScript Object Notation (JSON) or extensible markup language (XML) over an API. A reciprocal authorization may also be stored in the user profile that authorizes the other services to access data stored in the user profile.

A user profile may store the goals, interests, and preferences of the user as determined by the queries presented to a user via user interface wizards 126. These queries are discussed and presented in more detail in the subsequent diagrams. The user profile may also identify financial accounts the user has with one or more financial institutions.

The information in a user profile may be used to compare like cohorts. A user may be compared to a user via a number of dimensions such as age, marital status, location, interests, financial planning goals, income, job type, etc. In various examples, a machine learning model may be used to find the cohorts (e.g., using k-nearest neighbor, word embeddings, logistical regression, etc.).

A machine learning model may also be trained to provide suggestions to a user based on past behavior of users in similar cohorts. For example, weights of nodes in a neural network may be updated based on whether or not a user accepts a suggestion presented by notification component 122.

Figure 2A:
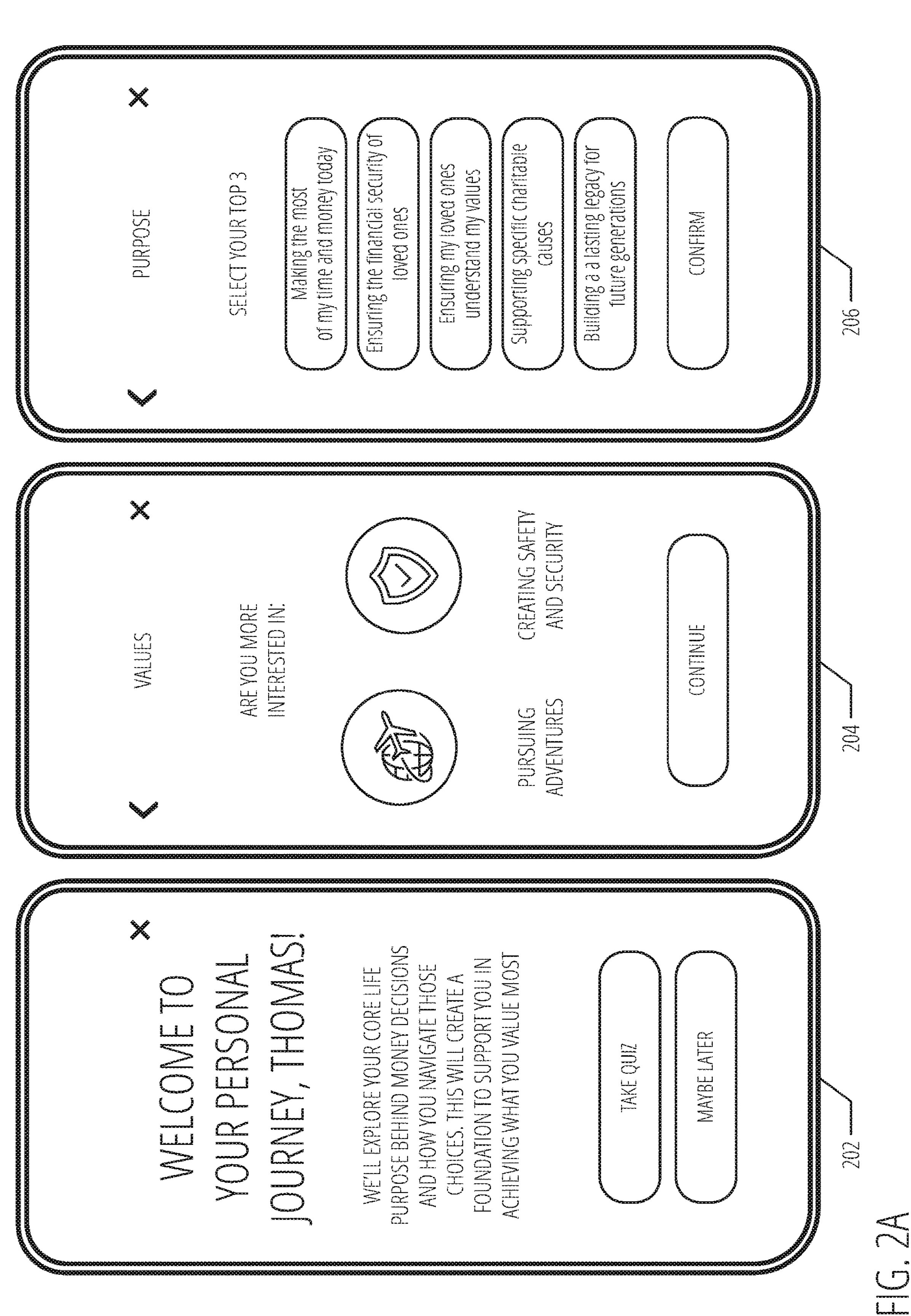
FIG. 2A and FIG. 2B are a series of user interfaces for receiving initial preferences of a user to provide a customized financial experience, according to various examples.
Figure 2B:
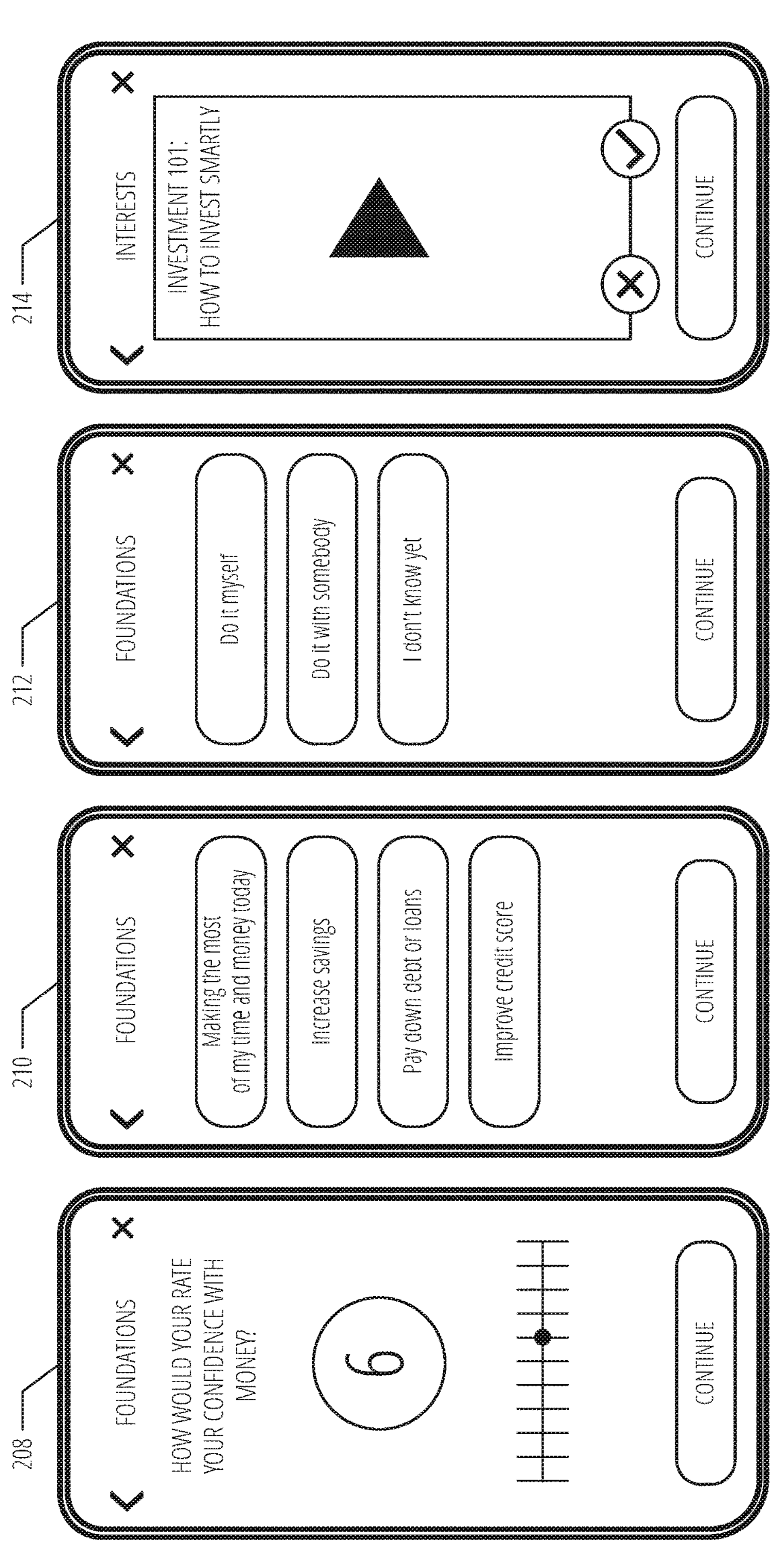

FIG. 2A and FIG. 2B are a series of user interfaces for receiving initial preferences of a user to provide a customized financial experience, according to various examples. The interfaces may be presented by user interface wizards 126, in various examples. As illustrated, each of the interfaces 202, 204, 206, 208, 210, 212, and 214 of FIG. 2A and FIG. 2B provide an option to skip a question. Thus, a user is provided the opportunity to give as much or as little information as they want with the ability to always change their mind in the future.

These initial questions may be used to gauge the user's values and the purpose, financial acuity (are they comfortable with money), ways the application may best support a user's financial journey, how they want to receive support, and determine their interests.

For example, the hypothetical person Thomas may indicate he prioritizes making the most of his time and money today and has a '6' for confidence with money. The questions presented may be based on answers Thomas has previously given. For example, user interface 214 presents a possible interest for Thomas related to learning how to invest smartly. This interest may be related to a purpose Thomas selected in a previous interface.

Figure 3A:
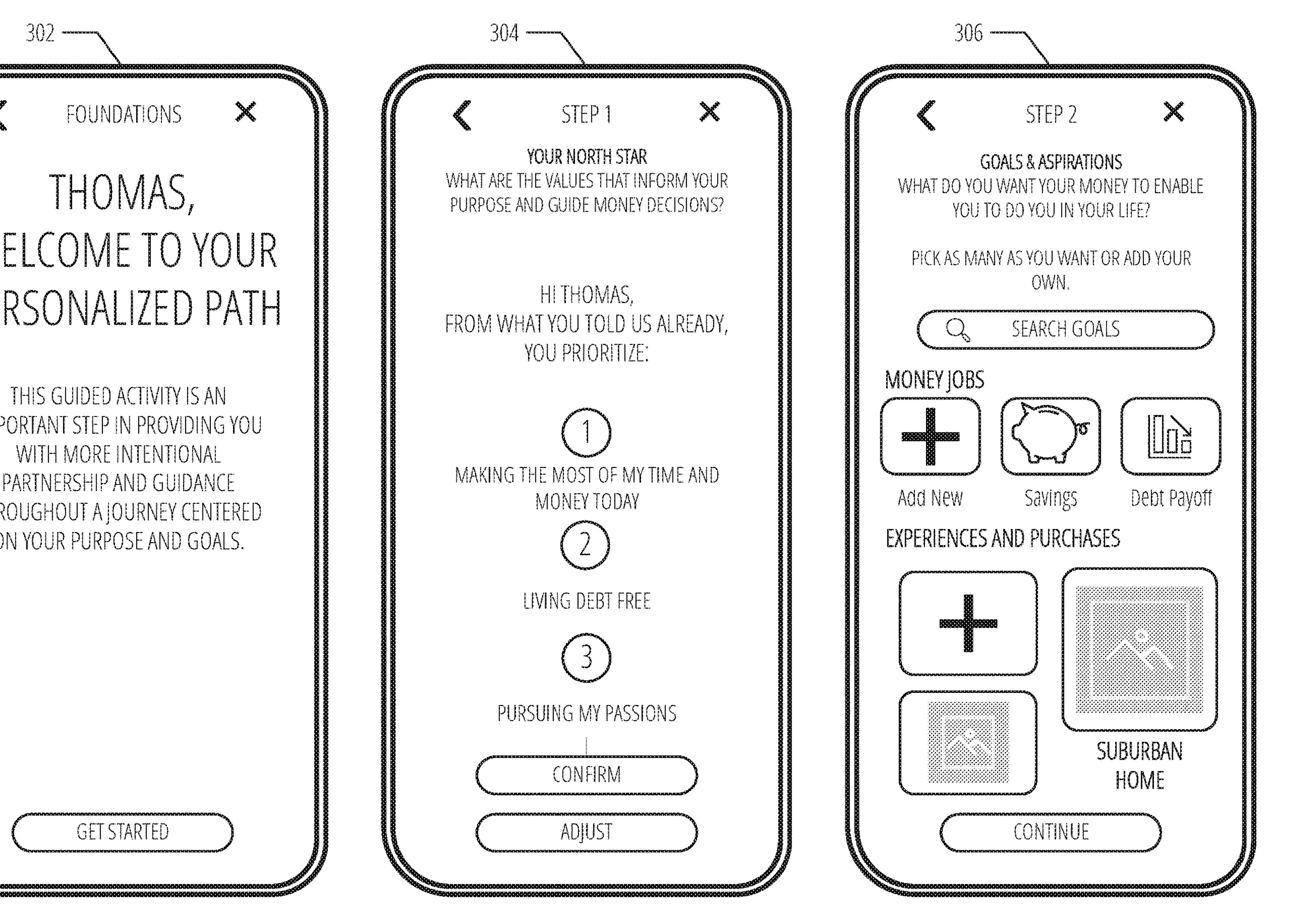
FIG. 3A, FIG. 3B, and FIG. 3C are a series of user interfaces for generating a vision board of a user, according to various examples.
Figure 3B:
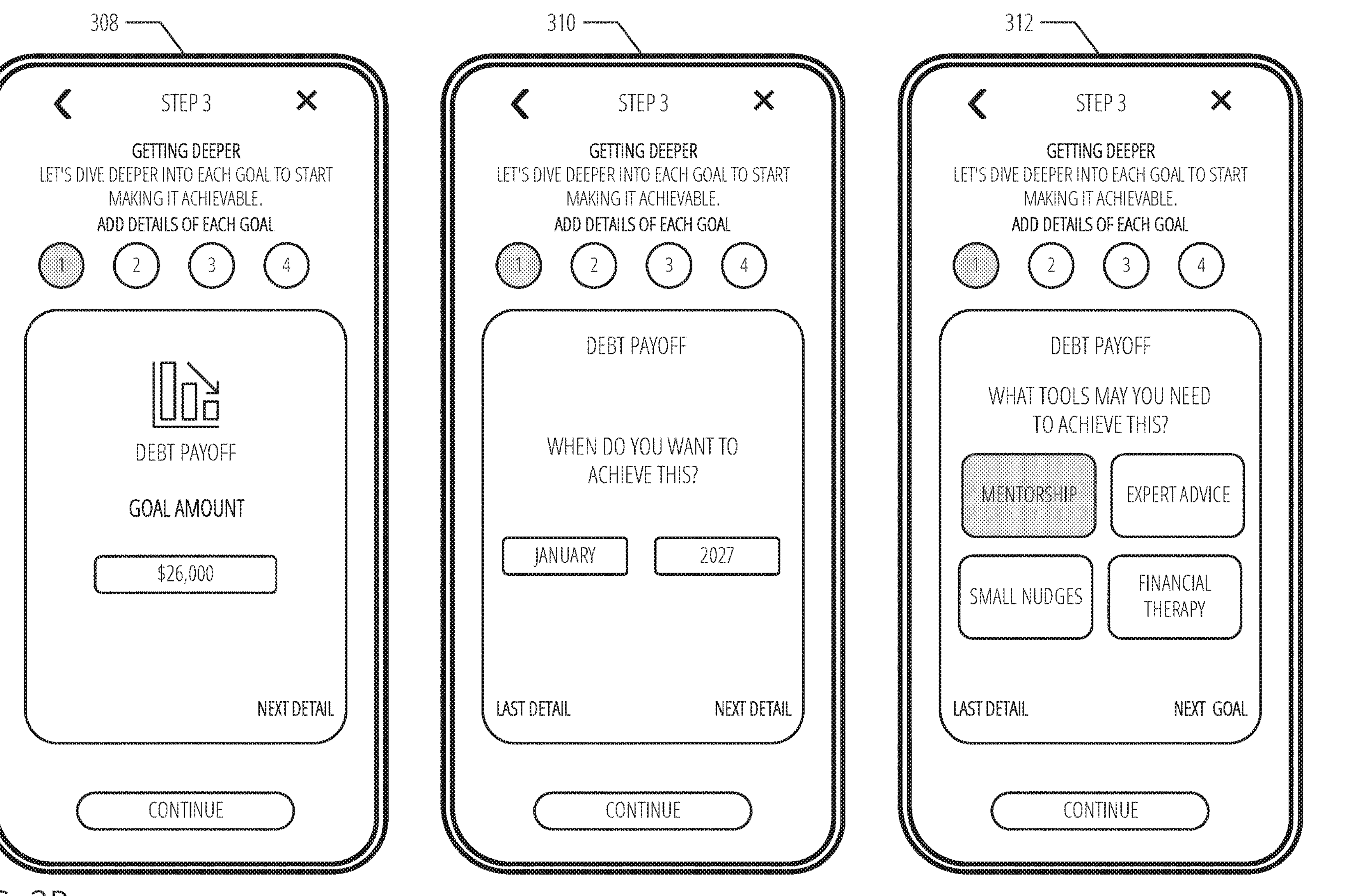
Figure 3C:
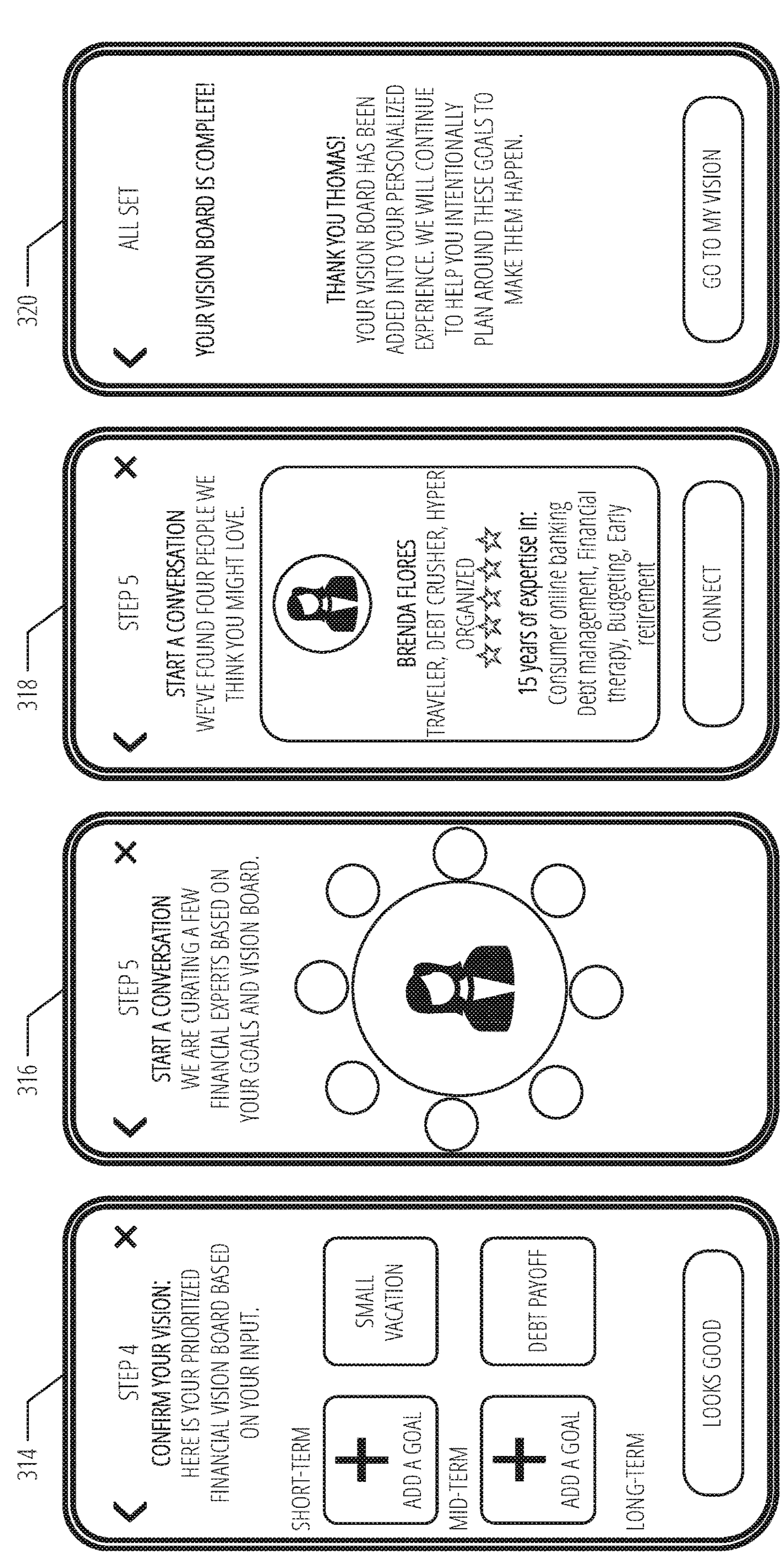

FIG. 3A, FIG. 3B, and FIG. 3C are a series of user interfaces for generating a vision board of a user, according to various examples. These interfaces may allow a user to customize their dashboard (e.g., homepage) and select a team of advisors. For example, user interface 302 and user interface 304 provide introductory screens to confirm the choices Thomas made in FIG. 2A and FIG. 2B.

User interface 306 may guide Thomas through adding goals, money jobs, and images to a dashboard. Based on the goals from user interface 306, user interfaces 308, 310, and 312 may present questions on the goals such as a title, an amount of the goal, a goal completion date, and what resources Thomas may need to accomplish the goal. User interface 314 may organize the goals into short-term, mid-term, and long-terms categories based on the completion date (e.g., if the completion data is within 1 month it is a short-term goal, within a year, it is medium, and long if the date is greater than a year) and present them for confirmation.

User interfaces 316 and 318 may be used for a user to connect with one or more financial experts. For example, user interface 318 presents an expert "card" that shows the experts interests and expertise. The presented expert may have been determined using a machine learning model that matches the user's interests with the expert's interests as well as the expert's expertise level. A user may have the opportunity to connect with the presented expert or search for other experts using the user's own criteria (using user interfaces not shown). A final user interface 320 may be presented that indicates the user's vision board is complete and a user interface element to go to the board now.

Figure 4:
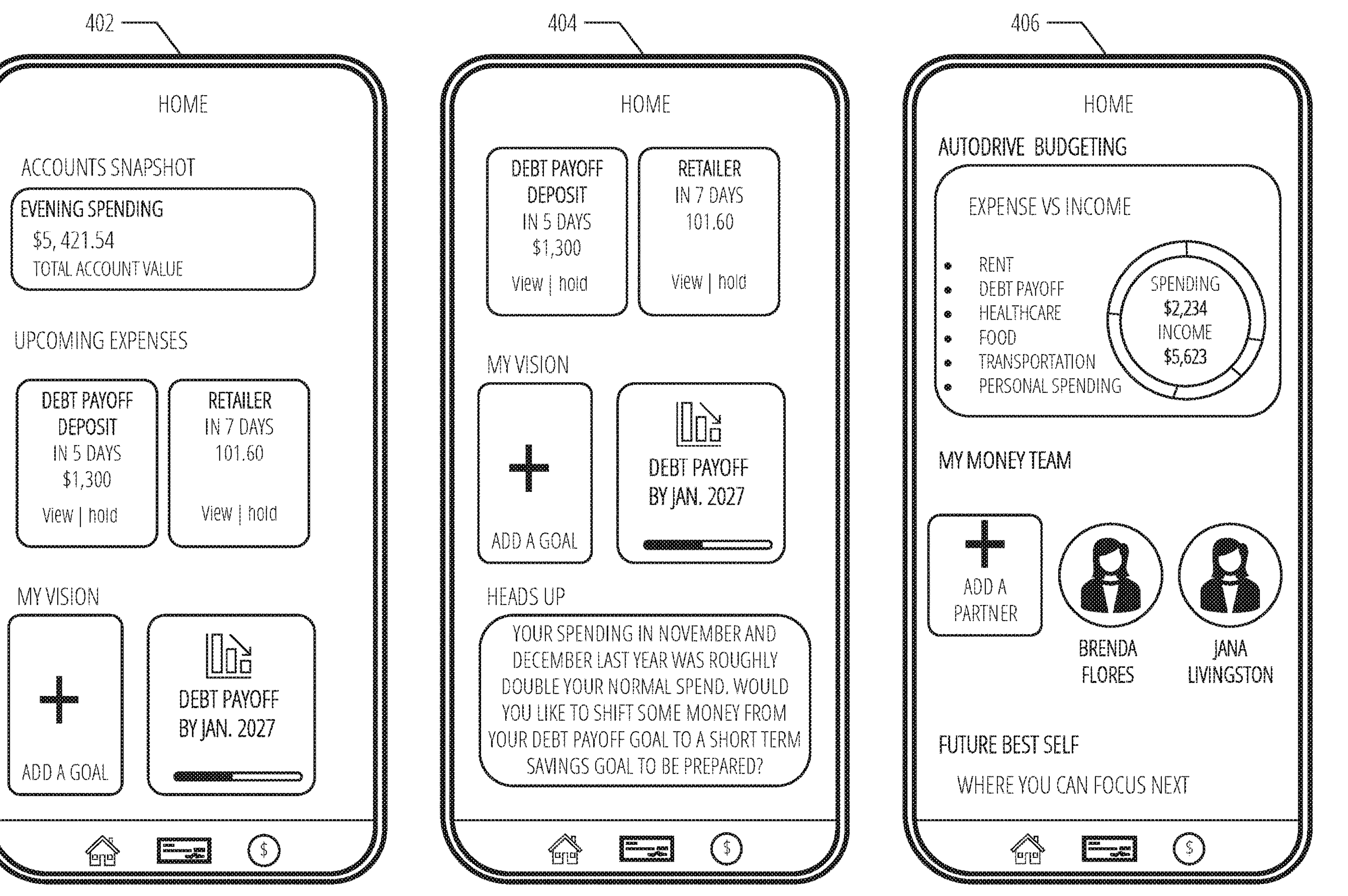
FIG. 4 is a series of user interface for viewing a user's customized interface, according to various examples.

FIG. 4 is a series of user interface for viewing a user's customized interface, according to various examples. For example, user interface 402 shows a snapshot of the user's financial accounts at top, upcoming expenses in the middle, and also includes user interface elements for the visions created using the previous user interfaces.

User interface 404 is a scrolled down version of user interface 402 and illustrates suggestions that may be provided by a machine learning model. For example, a model may be used that tracks spending/income and if there is a deviation of more than a certain percentage a suggestion may be presented to save more or pay down debt depending on the direction of the change.

User interface 406 is an auto-budgeting view that has been created for a user indicating a breakdown of inflow/outflow of funds. Additionally, the team of advisors the user selected in FIG. 3C may be presented alongside an option to add more members.

Figure 5:
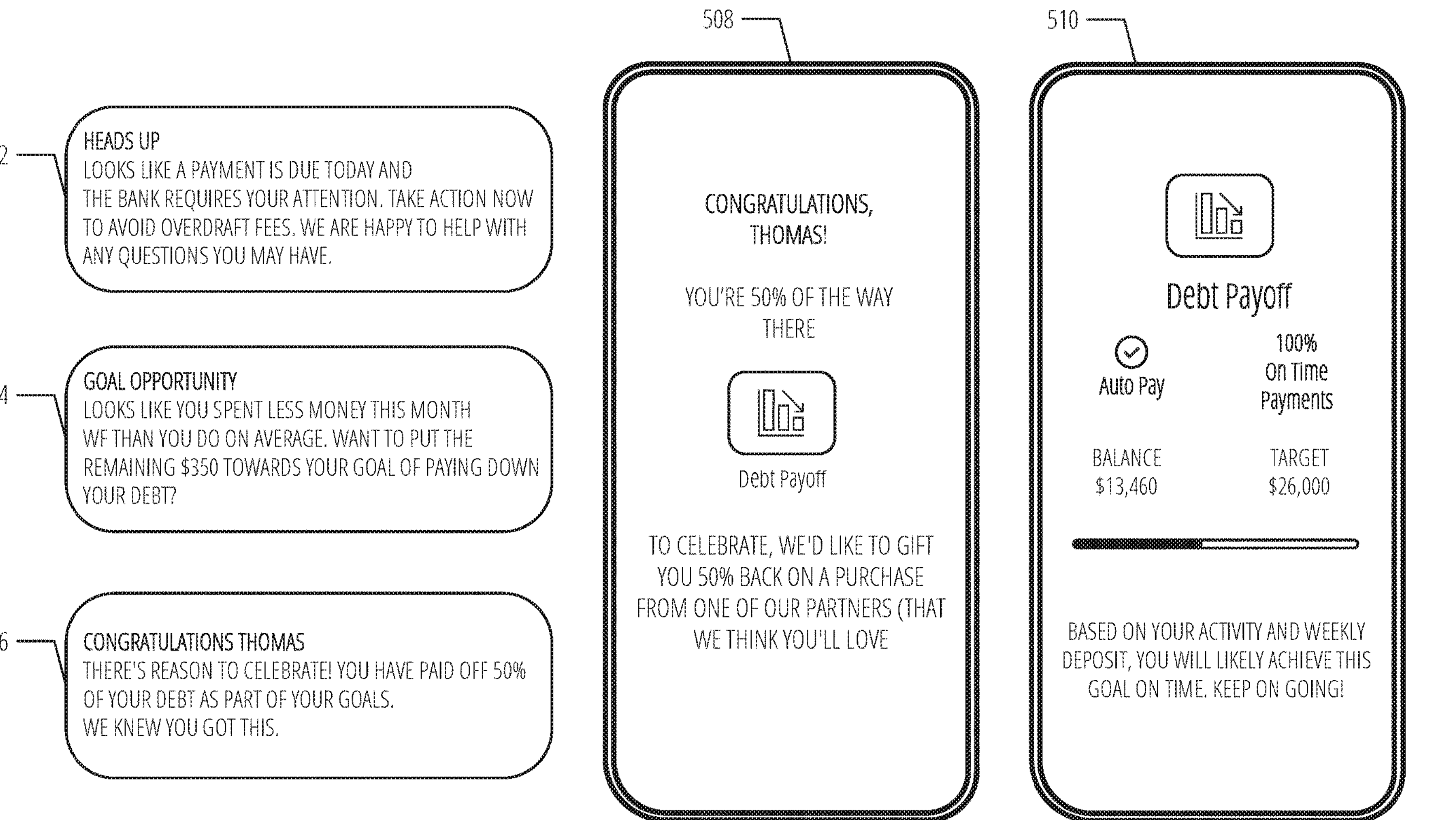
FIG. 5 presents user interfaces associated with actionable notifications, according to various examples.

FIG. 5 presents user interfaces associated with actionable notifications, according to various examples. Notifications 502, 504, and 506 may be sent to a computing device of a user via notification component 122. Notification 502 is a reminder that a bill is due. Notification may be the result of a machine learning model noticing a change is spending habit and presents an opportunity to pay down some debt.

Notification 506 is a congratulatory message indicating the user has paid down 50% of their goal. In response to clicking the message, a user interface such as user interface 508 may be presented. User interface 508 includes another congratulations and a set of rewards to the user based on their past transactions (e.g., to stores the user frequents). User interface 510 is a more detailed view of the goal.

Figure 6:
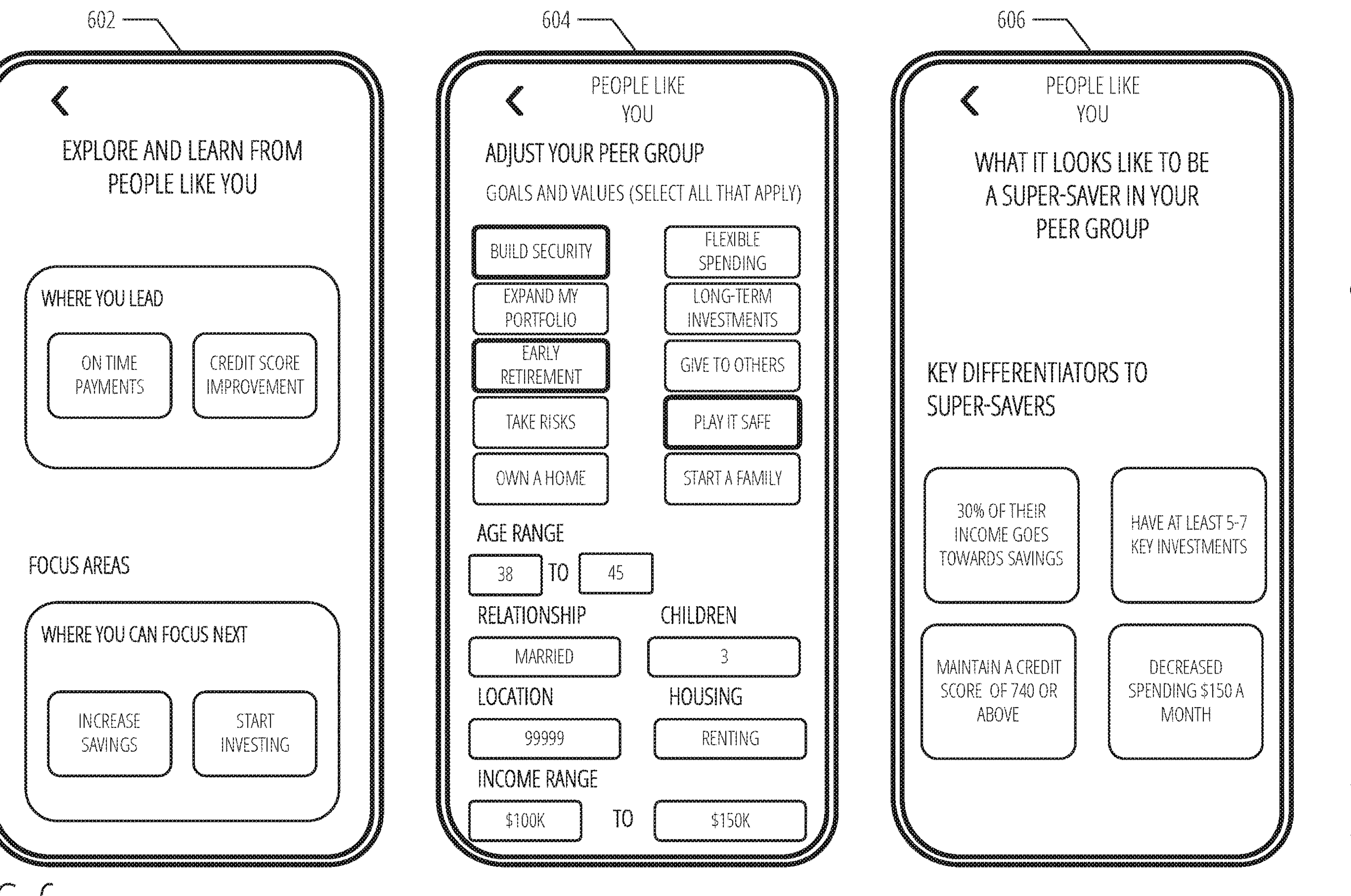
FIG. 6 is a series of user interfaces for comparing a user with other users, according to various examples.

FIG. 6 is a series of user interfaces for comparing a user with other users, according to various examples. User interface 602 is a snapshot of areas that the user is doing better at than a comparison group, as well as areas the user may improve on. For each of these areas, a link may be provided for the user to learn more.

User interface 604 is an interface to adjust the comparison group. As seen, a user may select goals and values as comparison criterion as well as demographic/income characteristics.

User interface 606 is a more detailed view characteristics of the top tier (as calculated by savings rate where a high savings rate is considered good) of a comparison group, in an example. The characteristics may each include a link for a user to learn more about how to achieve a certain characteristic (e.g., decrease spending, maintain a credit score above 740, etc.)

Figure 7A:
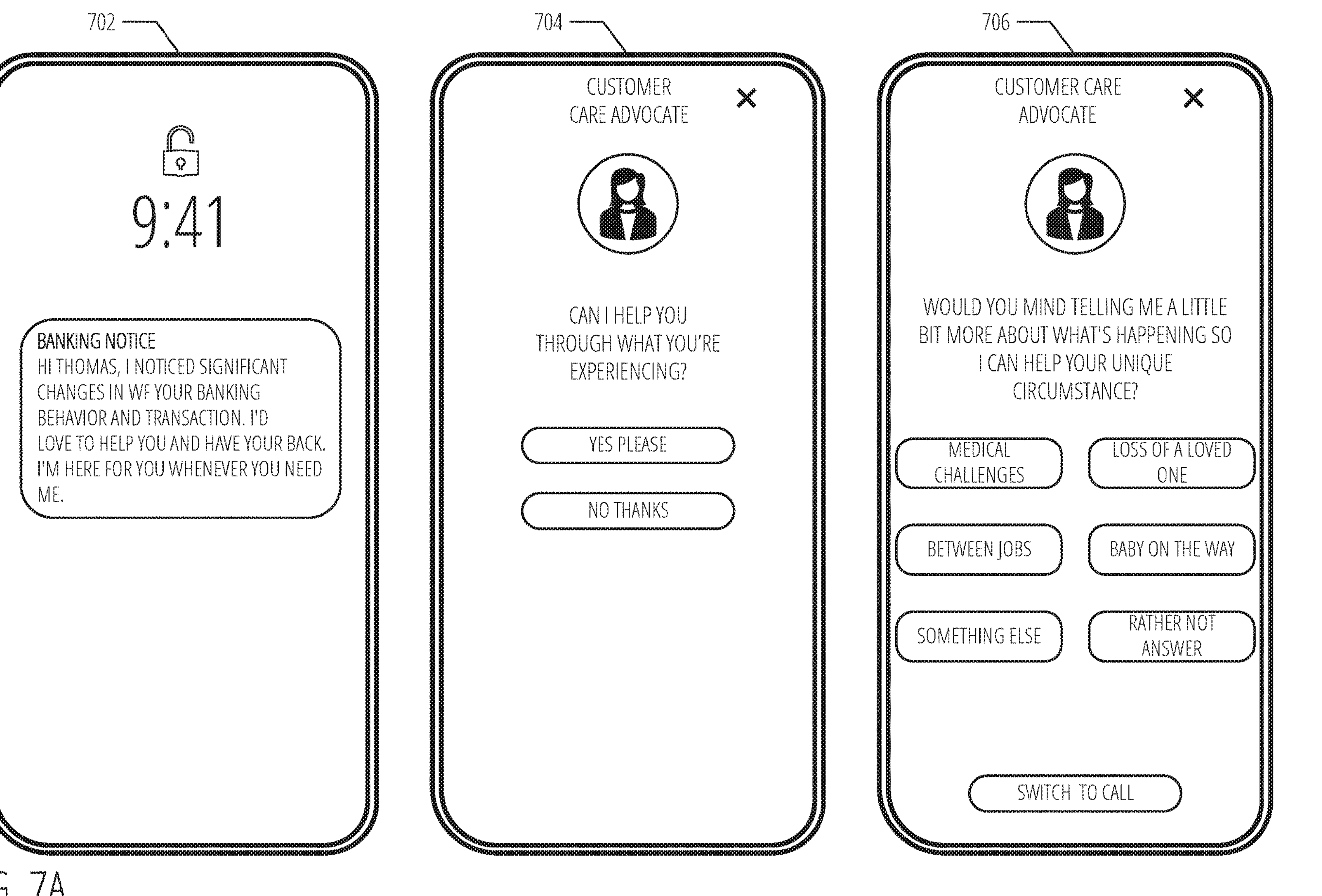
FIG. 7A and FIG. 7B present a series of user interfaces to facilitate a customer support to a user, according to various examples.
Figure 7B:
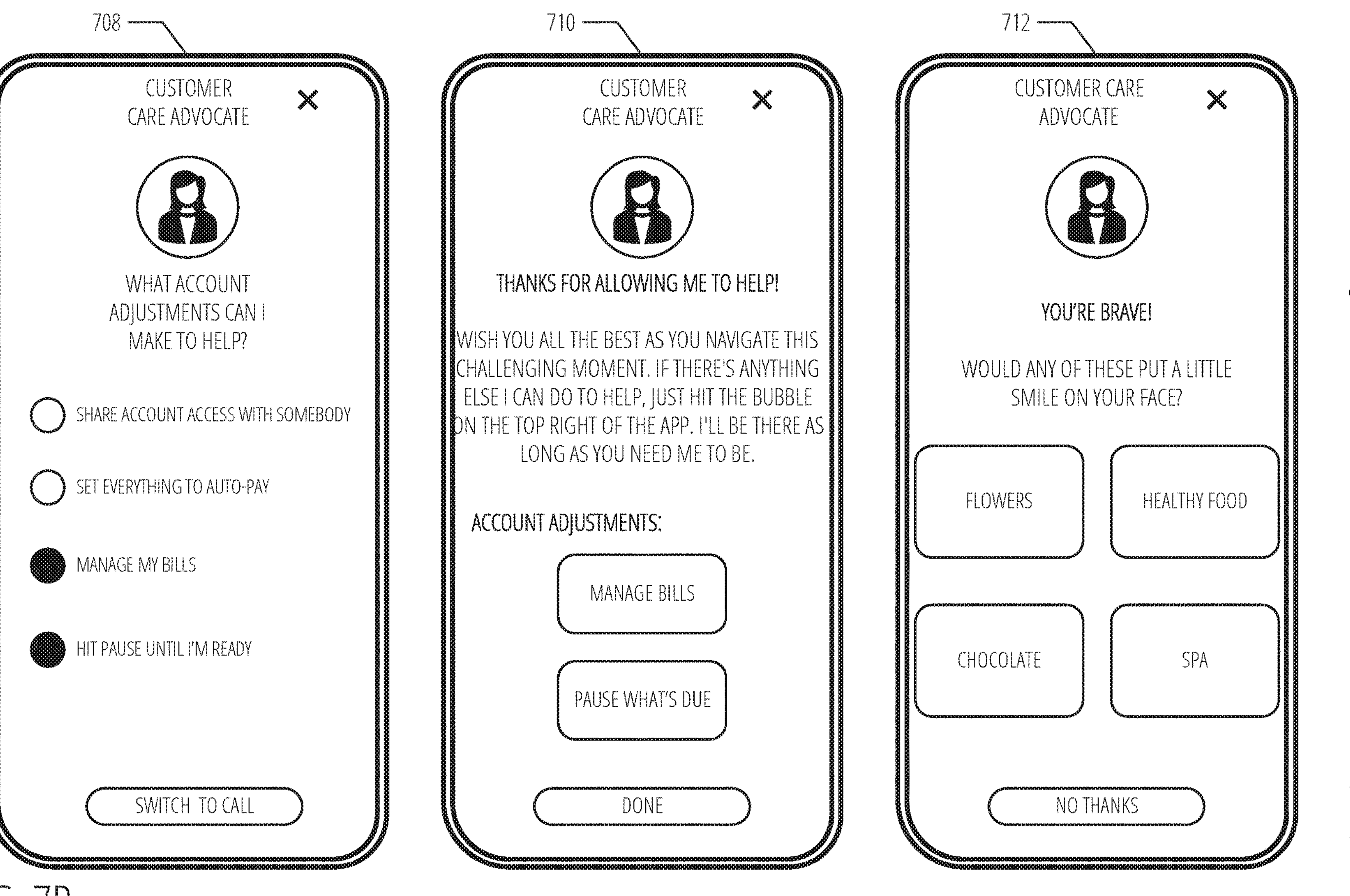

FIG. 7A and FIG. 7B present a series of user interfaces to facilitate a customer support to a user, according to various examples. Generally, a financial institution only contacts a user after something has gone wrong such as missing a payment, etc. And the contact is generally not one of sympathy or support. In contrast to these impersonal contacts, the interfaces of FIG. 7A and FIG. 7B are proactive and looking for ways to help.

User interface 702 is a push notification indicating there has been significant changes in the user's baseline behavior (e.g., as determined by a machine learning model). Upon clicking on the message user interface 704 may be presented that offers the user an opportunity to help with whatever may be happening in the user's life. User interface 706 include a number of options that may be selected by the user if they are comfortable doing so and provides a user interface element to call someone.

User interface 708 present a set of ways in which the financial institution may help the user. User interface 710 and user interface 712 are follow up interfaces confirming the changes and offers a gift to help the user during their current challenges.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium.

In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
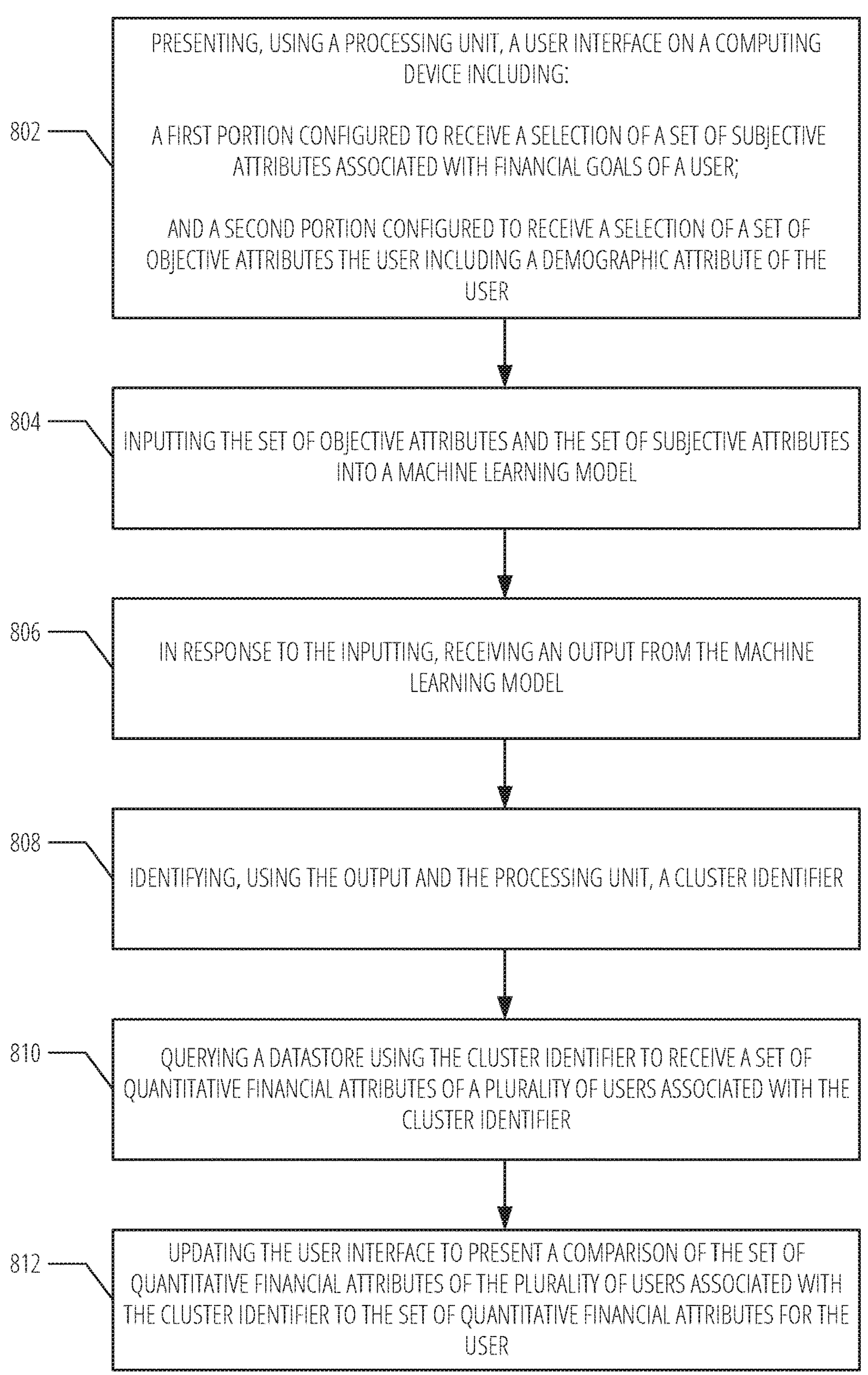
FIG. 8 is a flowchart of operations of a method to present an attribute comparison between a user and a cluster, according to various examples.

FIG. 8 is a flowchart of operations of a method to present an attribute comparison between a user and a cluster, according to various examples. The method is represented as a set of blocks 802 to 812 that describe the operations of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 8. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In various examples, the method includes an operation at block 802 of presenting, using a processing unit, a user interface on a computing device. The user interface may include a first portion configured to receive a selection of a set of subjective attributes associated with financial goals of a user. The interface may further include a second portion configured to receive a selection of a set of objective attributes the user. The set of objective attributes including a demographic attribute of the user.

The interface may initially be presented as part of a mobile application that has been installed on a computing device, such as client device 104. For example, the mobile application may be part of a service offered by a financial institution that is also operating application server 102. The user may log in using their credentials as described above with respect to user accounts 120. Furthermore, the configuration display of the information of the user interface may be performed by user interface wizards 126.

And various examples, the interface may be one such as presented in user interface 604. As illustrated in the interface, there are a set of goals and values, which may correspond to the subjective attributes associated with the financial goals of a user. Furthermore, the age range, relationship, children, location, housing, income range input elements may be considered the objective attributes.

The method may also include where the first portion includes an input element for each of the set of subjective attributes and where upon receiving a selection of a respective input element, an outline style of the respective input element is updated. For example, within user interface 604, the "build security" element, the "early retirement" element, and the "play it safe" element, are all outlined in a bolder outline than the unselected elements.

In various examples, the method includes an operation at block 804 of inputting the set of objective attributes and the set of subjective attributes into a machine learning model (e.g., a model from machine learning models 124). The method may also include where inputting the set of objective attributes and the set of subjective attributes into the machine learning model includes encoding the set of objective attributes and the set of subjective attributes into a numerical vector. The machine learning model may be a trained machine learning model using a k-means clustering algorithm with a plurality of cluster centroids.

The trained machine learning model may be comprised of a series of data points where each data point represents an anonymized user in user accounts 120. The data point may be a multi-dimensional vector that include encoded attributes of the user as machine learning models generally do not accept non-numerical data. Accordingly, encoding may include converting the subjective and objective attributes into a standardized and normalized vector format.

One technique for converting a subjective attribute such as the goals and values of the user (or other attribute) to a numerical format is using one-hot encoding in which each attribute is assigned an element position of a vector that is the length of the total number of possible attributes—e.g., <build security, flexible spending, expand my portfolio, . . . , start a family>. Thus, a vector input for a user that has selected build security, flexible spending, and start a family may be <1, 1, 0 . . . 1>.

The vector that is ultimately inputted to the machine learning model may be the concatenation of several elements, which may each be a vector themselves. For example, there may be one or more subjective attribute vectors and one or more objective attribute vectors.

For training the machine learning model the features (e.g., attributes) may first be chosen along with how they should be embedded (e.g., one-hot encoding). The training data for the machine learning model may be based on selected attributes of users as stored in user accounts 120. For example, a vector may be generated in the same manner as the one ultimately used to determine a cluster for a new user (e.g., as performed in the method of FIG. 8). Next, a number of clusters (k) may be chosen (e.g., 1000). One way to select 'k' is by using the elbow method, which involves plotting the within-cluster sum of squares (WCSS) against the number of clusters and selecting the number of clusters at the elbow point. The k-means clustering algorithm starts by randomly selecting 'k' initial cluster centroids. Then, it iteratively assigns each data point to the nearest centroid and updates the centroids based on the mean of the data points in the cluster until convergence.

In various examples, the method includes an operation at block 806 of, in response to the inputting, receiving an output from the machine learning model. The method may also include the output of the machine learning model is based on a Euclidean distance calculation between the numerical vector and the plurality of cluster centroids. The user's cluster may be considered the centroid that is the closest.

In various examples, the method includes an operation at block 808 of identifying, using the output and the processing unit, a cluster identifier. For example, a lookup table may be used that includes an identifier for each centroid.

In various examples, the method includes an operation at block 810 of querying a datastore using the cluster identifier to receive a set of quantitative financial attributes of a plurality of users associated with the cluster identifier. For example, in order to maintain anonymity of individual users, averages of the financial attributes of the user may be stored. In this manner, the lookup does not involve retrieving data from individual user accounts. The financial attributes may those such as average savings rate, average credit score, average number of investments, average spending, etc. Periodically (e.g., monthly), the averages may be recalculated.

For example, the method may include for a quantitative financial attribute of the quantitative financial attribute in the set of quantitative financial attributes calculating an average of the quantitative financial attribute for the plurality of users associated with the cluster identifier, and comparing the average to a value of the quantitative financial attribute of the user. The method may also include based on the comparing, classifying the quantitative financial attribute as a positive attribute or negative attribute for the user.

In various examples, the method includes an operation at block 812 of updating the user interface to present a comparison of the set of quantitative financial attributes of the plurality of users associated with the cluster identifier to the set of quantitative financial attributes for the user. For example, a user interface such as user interface 602 may be presented.

The comparisons may be presented in a narrative format. For example, if the user has a greater number of on time payments than the average, that information may be presented in a "where you lead" portion of the interface. In contrast, if the user has a below average savings rate with respect to their cluster, a "where can you focus next" portion of the interface may include a suggestion to increase savings. A lookup table may be used that translates above or below average values to narrative form that may be included in the interface.

Thus, the method may also include where updating the user interface to present the comparison of the set of quantitative financial attributes of the plurality of users associated with the cluster identifier to the set of quantitative financial attributes for the user includes segmenting the user interface into a positive attribute portion (e.g., where the user is ahead of the average) and a negative attribute portion (where the user is behind the average), and presenting the quantitative financial attribute into the positive attribute portion or negative attribute portion based on the classifying.

Figure 9:
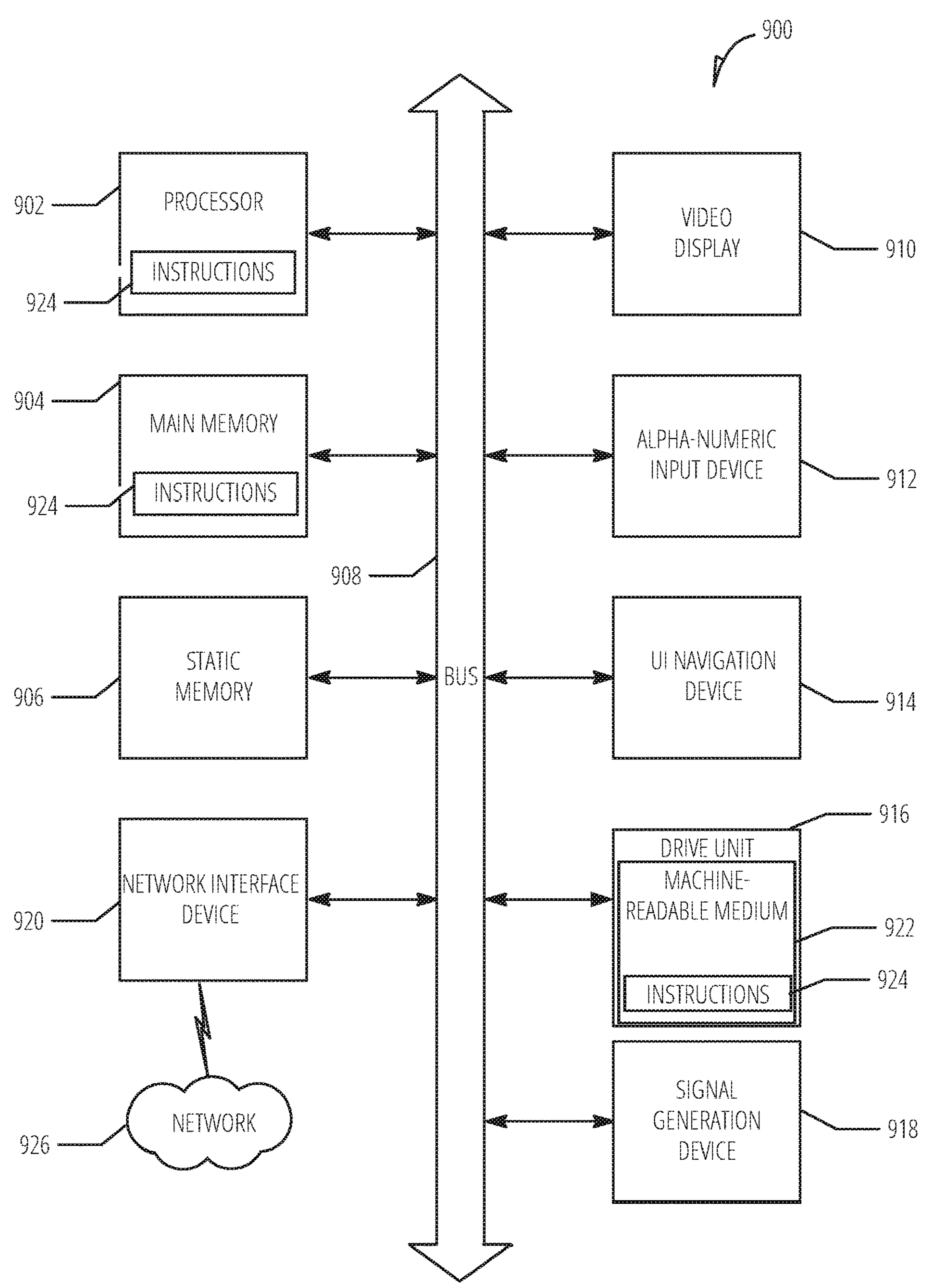
FIG. 9 is a block diagram illustrating an example machine upon which any one or more of the techniques (e.g., methodologies) discussed herein may be performed, according to an example embodiment.

FIG. 9 illustrates a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the at least one processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, 4G LTE/LTE-A or WiMAX networks, and 5G). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:

presenting, using a processing unit, a user interface on a computing device, the user interface including:

a first portion configured to receive a selection of a set of subjective attributes associated with financial goals of a user; and a second portion configured to receive a selection of a set of objective attributes the user, the set of objective attributes including a demographic attribute of the user;

inputting the set of objective attributes and the set of subjective attributes into a machine learning model;

in response to the inputting, receiving an output from the machine learning model, the output identifying a nearest cluster centroid of a plurality of cluster centroids based on the set of objective attributes and the set of subjective attributes as selected by the user via the first portion and the second portion of the user interface;

identifying, using the output and the processing unit, a cluster identifier, the cluster identifier determined by referencing a lookup table that maps each of the plurality of cluster centroids to a respective cluster identifier;

querying a datastore using the cluster identifier to receive a set of quantitative financial attributes of a plurality of users associated with the cluster identifier;

for a quantitative financial attribute of the quantitative financial attribute in the set of quantitative financial attributes:

calculating an average of the quantitative financial attribute for the plurality of users associated with the cluster identifier; and comparing the average to a value of the quantitative financial attribute of the user;

based on the comparing, classifying the quantitative financial attribute as a positive attribute or negative attribute for the user; and updating the user interface to present a comparison of the set of quantitative financial attributes of the plurality of users associated with the cluster identifier to the set of quantitative financial attributes for the user.

2. The method of claim 1, wherein inputting the set of objective attributes and the set of subjective attributes into the machine learning model includes:

encoding the set of objective attributes and the set of subjective attributes into a numerical vector.

3. The method of claim 2, wherein the machine learning model is a trained machine learning model using a k-means clustering algorithm with a plurality of cluster centroids.

4. The method of claim 3, the output of the machine learning model is based on a Euclidean distance calculation between the numerical vector and the plurality of cluster centroids.

5. The method of claim 1, wherein updating the user interface to present the comparison of the set of quantitative financial attributes of the plurality of users associated with the cluster identifier to the set of quantitative financial attributes for the user includes:

segmenting the user interface into a positive attribute portion and a negative attribute portion; and presenting the quantitative financial attribute into the positive attribute portion or negative attribute portion based on the classifying.

6. The method of claim 1, wherein the first portion includes an input element for each of the set of subjective attributes and wherein upon receiving a selection of a respective input element, an outline style of the respective input element is updated.

7. A non-transitory computer-readable medium comprising instructions, which when executed by a processing unit configure the processing unit to perform operations comprising:

presenting a user interface on a computing device, the user interface including:

a first portion configured to receive a selection of a set of subjective attributes associated with financial goals of a user; and a second portion configured to receive a selection of a set of objective attributes the user, the set of objective attributes including a demographic attribute of the user;

inputting the set of objective attributes and the set of subjective attributes into a machine learning model;

in response to the inputting, receiving an output from the machine learning model, the output identifying a nearest cluster centroid of a plurality of cluster centroids based on the set of objective attributes and the set of subjective attributes as selected by the user via the first portion and the second portion of the user interface;

identifying, using the output, a cluster identifier, the cluster identifier determined by referencing a lookup table that maps each of the plurality of cluster centroids to a respective cluster identifier;

querying a datastore using the cluster identifier to receive a set of quantitative financial attributes of a plurality of users associated with the cluster identifier;

for a quantitative financial attribute of the quantitative financial attribute in the set of quantitative financial attributes:

calculating an average of the quantitative financial attribute for the plurality of users associated with the cluster identifier; and comparing the average to a value of the quantitative financial attribute of the user:

based on the comparing, classifying the quantitative financial attribute as a positive attribute or negative attribute for the user; and updating the user interface to present a comparison of the set of quantitative financial attributes of the plurality of users associated with the cluster identifier to the set of quantitative financial attributes for the user.

8. The non-transitory computer-readable medium of claim 7, wherein inputting the set of objective attributes and the set of subjective attributes into the machine learning model includes:

encoding the set of objective attributes and the set of subjective attributes into a numerical vector.

9. The non-transitory computer-readable medium of claim 8, wherein the machine learning model is a trained machine learning model using a k-means clustering algorithm with a plurality of cluster centroids.

10. The non-transitory computer-readable medium of claim 9, the output of the machine learning model is based on a Euclidean distance calculation between the numerical vector and the plurality of cluster centroids.

11. The non-transitory computer-readable medium of claim 7, wherein updating the user interface to present the comparison of the set of quantitative financial attributes of the plurality of users associated with the cluster identifier to the set of quantitative financial attributes for the user includes:

segmenting the user interface into a positive attribute portion and a negative attribute portion; and presenting the quantitative financial attribute into the positive attribute portion or negative attribute portion based on the classifying.

12. The non-transitory computer-readable medium of claim 7, wherein the first portion includes an input element for each of the set of subjective attributes and wherein upon receiving a selection of a respective input element, an outline style of the respective input element is updated.

13. A system comprising:

a processing unit; and a storage device comprising instructions, which when executed by the processing unit, configure the processing unit to perform operations comprising:

presenting a user interface on a computing device, the user interface including:

a first portion configured to receive a selection of a set of subjective attributes associated with financial goals of a user; and a second portion configured to receive a selection of a set of objective attributes the user, the set of objective attributes including a demographic attribute of the user;

inputting the set of objective attributes and the set of subjective attributes into a machine learning model;

in response to the inputting, receiving an output from the machine learning model, the output identifying a nearest cluster centroid of a plurality of cluster centroids based on the set of objective attributes and the set of subjective attributes as selected by the user via the first portion and the second portion of the user interface;

identifying, using the output, a cluster identifier, the cluster identifier determined by referencing a lookup table that maps each of the plurality of cluster centroids to a respective cluster identifier;

querying a datastore using the cluster identifier to receive a set of quantitative financial attributes of a plurality of users associated with the cluster identifier;

for a quantitative financial attribute of the quantitative financial attribute in the set of quantitative financial attributes:

calculating an average of the quantitative financial attribute for the plurality of users associated with the cluster identifier; and comparing the average to a value of the quantitative financial attribute of the user;

based on the comparing, classifying the quantitative financial attribute as a positive attribute or negative attribute for the user; and updating the user interface to present a comparison of the set of quantitative financial attributes of the plurality of users associated with the cluster identifier to the set of quantitative financial attributes for the user.

14. The system of claim 13, wherein inputting the set of objective attributes and the set of subjective attributes into the machine learning model includes:

encoding the set of objective attributes and the set of subjective attributes into a numerical vector.

15. The system of claim 14, wherein the machine learning model is a trained machine learning model using a k-means clustering algorithm with a plurality of cluster centroids.

16. The system of claim 15, the output of the machine learning model is based on a Euclidean distance calculation between the numerical vector and the plurality of cluster centroids.

17. The system of claim 13, wherein updating the user interface to present the comparison of the set of quantitative financial attributes of the plurality of users associated with the cluster identifier to the set of quantitative financial attributes for the user includes:

segmenting the user interface into a positive attribute portion and a negative attribute portion; and presenting the quantitative financial attribute into the positive attribute portion or negative attribute portion based on the classifying.

* * * * *